2,902,341
PROCESS FOR THE PREPARATION OF WATER-SOLUBLE METAL SULFATES, PHOSPHATES OR NITRATES

Abraham Baniel, West Romema, Haifa, and Ruth Blumberg, Mount Carmel, Haifa, Israel, assignors to Makhtsavei Israel, Tel Aviv, Israel, an Israeli company No Drawing. Application April 1, 1957
Serial No. 649,634
Claims priority, application Israel May 1, 1956
9 Claims. (Cl. 23—50)

This invention relates to the preparation of water-soluble metal sulfates, phosphates or nitrates by the reaction of the chlorides of the metals in question with free sulfuric, phosphoric or nitric acid, or with partly neutralized sulfuric or phosphoric acid, i.e. an acid sulfate or phosphate.

In the following, the metal will be referred to by the symbol M, the anion (other than the chloride ion) by X, and the desired salt by MX, irrespective of the valencies of the metals and anions.

The invention has the object to provide a process of the kind referred to, in which the liberated hydrochloric acid can be removed from the reaction system without requiring distillation, in order to shift the equilibrium of the reaction system towards the completion of the formation of the desired MX compound.

Hitherto, where water-soluble salts have been prepared by the reaction of the corresponding chlorides with sulfuric acid, it has been necessary to use relatively highly concentrated sulfuric acid and to remove the liberated hydrochloric acid by distillation. The use of concentrated sulfuric acid has been required in order that the bulk of water to be handled may not be increased too much. The distillation of the hydrochloric acid is expensive in terms of energy and of capital investment, the more so the greater the dilution. In addition, the corrosive action of the distilling acid necessitates special equipment.

Nitrates can not at all be produced by the reaction of the corresponding chlorides with free nitric acid without the oxidation of hydrochloric acid by the nitric acid. Moreover, the liberated hydrochloric acid can not be separated efficaciously from the free nitric acid, chloride and nitrate, with which the free hydrochloric acid is in equilibrium in the reaction mixture. In particular, free nitric acid would distill together with the hydrochloric acid.

Nor can phosphates conveniently be prepared by the reaction of the corresponding chlorides with phosphoric acid unless a large excess of the latter is used since at the high distilling temperatures required for expelling the free hydrochloric acid from the reaction mixture, phosphoric acid is apt to condense, with the result that instead of pure phosphates, at best a mixture of phosphates, metaphosphates and the salt of other phosphorus-oxygen acids is obtained.

The invention consists in a process for the preparation of water-soluble metal (including ammonium) sulfates, phosphates or nitrates, wherein the chlorides of the corresponding metals are reacted in an aqueous medium with sulfuric, phosphoric or nitric acid, respectively, and hydrochloric acid is extracted from the aqueous liquor with a solvent of limited mutual miscibility with water and being a solvent for HCl but not for any of the metal salts present in the reaction mixture; the solvent phase is separated from the aqueous phase; and some amount of the desired metal salt is separated in solid form from the extracted aqueous phase.

Owing to the distribution of free HCl between the aqueous and solvent phases, the equilibrium existing up to the extraction in the aqueous phase is disturbed, and some more MX and HCl can form. By successively repeated extraction operations the reaction can be completed until either the whole MCl or the whole HX has been used up.

However, in the technical performance of the process it is preferable to recycle the extracted aqueous phase after separation of some amount of solid MX and after making it up with MCl, HX and water in order substantially to restore the original composition of the reaction mixture. In this manner the process can be performed as a continuous one, which can go on at a very quick pace. It is also possible to carry the extraction out in countercurrent.

In some cases the desired MX compound remains dissolved in the aqueous liquor and will have to be brought to crystallisation by cooling. The solid precipitate is then removed by a conventional separating operation, and the mother liquor may be recycled. The difference between the reaction and precipitation temperatures need, as a rule, not be very great, say of the order of 10 to 20° C.

In other cases, where the saturation concentration of the MX compound increases and decreases as the concentration of HCl increases and decreases, respectively, the concentration of X-anion in the reaction mixture may be chosen so high that as some of the liberated HCl is extracted into the solvent phase, a substantial quantity of the desired MX compound precipitates without positive lowering of the temperature of the aqueous phase.

The reaction may in many cases be carried out at the ambient temperature. In some cases it will be preferred, or even be necessary, to choose a higher reaction temperature. The proper conditions of the reaction will have to be determined for each particular reaction in accordance with known physical data and/or by experiment.

From the solvent phase a relatively highly concentrated aqueous solution of HCl can be separated by the addition of a second solvent which is water-immiscible, does not dissolve hydrochloric, sulfuric, phosphoric nor nitric acid, and is miscible with the first solvent. Hydrocarbons such as petroleum hydrocarbons in the naphtha to gas oil range, and aromatic hydrocarbons like benzene, toluene or xylenes, are examples of suitable solvents of this second kind. The aqueous acid then separates as bottom phase and can be drawn off. The solvent mixture is preferably submitted to fractionated distillation, and the two solvents can separately be recycled to the respective stages of the process.

While sulfuric acid does virtually not pass into the solvent phase, nitric acid and phosphoric acid are distributed between the aqueous and solvent phases. The separation of HCl from either nitric or phosphoric acid can then be effected in different ways. For example, a solvent phase containing aqueous phosphoric and hydrochloric acids can be fractionated by distillation, whereby aqueous hydrochloric acid and the solvent are obtained as separate distillate fractions, and highly concentrated phosphoric acid remains as residue. The solvent and phosphoric acid can be recycled.

In the case of either nitric or phosphoric acid, the solvent phase may be scrubbed with a concentrated aqueous chloride solution, preferably of the same metal whose phosphate or nitrate is to be made, which removes all the phophoric or nitric acid from the solvent and exchanges part of it for HCl. Thereafter the HCl can be separated from the solvent in the manner indicated above.

Solvent usable with especial advantage for the purposes of the invention are the $C_4$— and higher monohydric aliphatic alcohols, and for economical reasons especially the commercially available butanols and pentanols and their mixtures. These alcohols dissolve a small proportion of the water from which they are freed by the subsequent separation of the HCl from the alcohol.

The invention is illustrated by the following examples to which it is not limited.

EXAMPLE 1

*Preparation of potassium sulfate*

An original reaction solution is composed as follows:

| | Gr. |
|---|---|
| $H_2O$ | 1000 |
| KCl | 302 |
| $H_2SO_4$ (monohydrate) | 218 |
| HCl | 2 |
| | 1522 |

The solution can be prepared by mixing the components at or above 20° C. until complete dissolution takes place.

Alternatively 340 gr. KCl are first dissolved in 1000 gr. of water and 220 gr. of $H_2SO_4$ are then added. At 20° C. some 20 gr. of KCl and $K_2SO_4$ precipitate, and the supernatant mother liquor has then the composition indicated above. It is to be noted that the $H_2SO_4$ need not be used as concentrated acid (monohydrate). In fact, the invention makes possible the utilization of recovered industrial waste acid of much lower concentration. The proportion of water contained therein will be taken into account in the reaction solution, so that in the end the composition will be that stated hereinbefore.

After complete dissolution of the KCl in the liquor, or in the alternative case after the separation of the supernatant liquor from the precipitate, the aqueous liquor is thoroughly stirred for 15 minutes with an equal quantity (by weight) of isoamyl alcohol. For this purpose a vessel fitted with an efficient stirring paddle should be used.

When the stirring is interrupted, the mixture is left to settle, and forms three layers, namely, an alcoholic top phase, an aqueous phase therebeneath, and a crystalline precipitate.

The alcoholic phase is separated from the remainder, then the precipitate is separated from the aqueous phase by filtration or in any other suitable way. The separated precipitate amounts to about 30 gr. (calculated on a dry basis) and contains 97 to 98% of $K_2SO_4$.

The aqueous liquor separated from this precipitate is recharged with 25.6 gr. of KCl, 16.9 gr. of $H_2SO_4$ (calculated as monohydrate) and 29 gr. of water in order to compensate for the extracted and precipitated matter. The liquor thus made up is recycled and subjected to another extracting operation with a fresh charge of alcohol.

The alcohol phase separated from the reaction mixture is diluted with benzene at the volume ratio 1:1, whereby aqueous HCl is made to separate. This is allowed to settle as a bottom layer and drawn off, the yield being 41.5 gr. of aqueous HCl of 30% weight strength. The isoamyl alcohol/benzene mixture is fractionated, and the two solvents are separately returned to the respective stages of the process.

In the net result, 25.6 gr. of KCl and 16.9 gr. of $H_2SO_4$ have been converted into 30 gr. of $K_2SO_4$ and 41.5 gr. of 30% by weight aqueous HCl.

EXAMPLE 2

*Preparation of anhydrous sodium sulfate*

The original reaction mixture is composed of:

| | Gr. |
|---|---|
| Water | 1090 |
| $H_2SO_4$ | 196 |
| NaCl | 176.2 |
| $Na_2SO_4$ | 35 |
| | 1497.2 |

The sulfuric acid employed may be recovered waste acid of a concentration of about 35–40% by weight. In the calculation of the amount of water to be added, the water contents of the sulfuric acid are to be taken into account.

The mixture is stirred at a temperature between 20° and 30° C. until complete dissolution has taken place. The solution is then extracted with isoamyl alcohol (at the ratio of 1:1 by weight), which takes up 51.4 gr. of HCl.

From the separated alcohol phase, 171 gr. of aqueous HCl of about 30% by weight strength are recovered by the addition of an equal volume of benzene.

The aqueous phase separated from the alcohol phase is cooled to 4° C. with vigorous stirring, whereby a precipitate of Glauber salt ($Na_2SO_4 \cdot 10H_2O$) is produced. By adjusting the intensity of stirring and the rate of cooling, crystals of the desired size can be obtained.

The precipitate is removed from the supernatant mother liquor by suction or centrifugation and consists of 550 gr. of crude Glauber salt (calculated on a dry basis).

This precipitate is melted at 40° C. and yields 100 gr. of anhydrous $Na_2SO_4$ which is filtered off from the liberated crystal water and dried. The product is of high purity.

The mother liquors remaining after the separation of the Glauber salt and of the anhydrous salt are combined into a liquor of the following composition:

| | Gr. |
|---|---|
| Water | 970 |
| $H_2SO_4$ | 127 |
| NaCl | 94 |
| $Na_2SO_4$ | 35 |

This liquor is made up with

| | Gr. |
|---|---|
| Water | 120 |
| $H_2SO_4$ | 69 |
| NaCl | 82.2 | and then subjected to a new extraction and separation cycle.

EXAMPLE 3

*Preparation of Glauber salt*

The original liquor is composed as follows:

| | Gr. |
|---|---|
| Water | 1400 |
| $H_2SO_4$ | 273 |
| NaCl | 254 |
| $Na_2SO_4$ | 187 |
| | 2114 |

The reaction and extraction proceed as described in Example 2. The recovery of 30% by weight aqueous HCl from the alcohol layer is 280 gr.

The aqueous phase separated from the alcohol phase is cooled to 12° C. whereby 370 gr. of Glauber salt are precipitated. This precipitate is filtered off. The filtrate has the following composition:

| | Gr. |
|---|---|
| Water | 1000 |
| $H_2SO_4$ | 161 |
| NaCl | 120 |
| $Na_2SO_4$ | 187 |

It is made up with:

| | Gr. |
|---|---|
| Water | 400 |
| $H_2SO_4$ | 112 |
| NaCl | 134 | and recycled.

EXAMPLE 4

Preparation of potassium nitrate

An initial reaction solution of the following composition is prepared at 20° to 30° C.:

|  | Gr. |
|---|---|
| $H_2O$ | 4127.0 |
| KCl | 174.5 |
| $KNO_3$ | 200.0 |
| $HNO_3$ | 183.0 |
| | 4684.5 |

This solution is extracted in succession with two portions of 1000 gr. of n-butanol each. The separated aqueous layer is cooled to 15° C. 101 gr. of $KNO_3$ precipitate and are recovered by filtration.

The separated solvent layer contains both HCl and $HNO_3$. For the removal of the latter the solvent layer is scrubbed with 76.5 gr. of a 43% by weight aqueous KCl solution (whereby virtually the whole $HNO_3$ is extracted into the aqueous solution.

The scrubbed solvent is then admixed with benzene as described in Example 1, whereby 122 gr. of 30% by weight aqeuous HCl are recovered.

The mother liquor from the filtration of $KNO_3$ and the aqueous layer from the scrubbing operation are now combined and brought to 20° C. or higher. 74.5 gr. of KCl. 63 gr. of $HNO_3$ and 420 gr. $H_2O$ are added and a liquor having the composition of the starting liquor is thereby re-constituted. This is recycled.

EXAMPLE 5

Preparation of di-sodium phosphate ($Na_2HPO_4 \cdot 12H_2O$)

The original reaction solution is composed as follows:

|  | Gr. |
|---|---|
| $Na_2HPO_4$ | 40.0 |
| NaCl | 82.5 |
| $H_3PO_4$ | 69.0 |
| Water | 1192.0 |
| | 1383.5 |

At 15° C. this solution is extracted with isoamyl alcohol in the ration 1:1 by weight whereby an amount of HCl equivalent to about 80% of the chloride ion present is extracted into the alcohol.

The aqueous phase is separated from the alcohol phase and cooled to 10° C., whereby 202 gr. of crystalline $Na_2HPO_4 \cdot 12H_2O$ are precipitated. The precipitate is separated. The mother liquor has the following composition:

|  | Gr. |
|---|---|
| Water | 1000 |
| $Na_2HPO_4$ | 37 |
| NaCl | 16.5 |
| $H_3PO_4$ | 13.4 |

It is made up with 57.5 gr. aqueous $H_3PO_4$ (85% by weight strength) and scrubbing brine (see below) containing 66 gr. of NaCl, 192 gr. of water, 6.6 gr. of $H_3PO_4$ and 3 gr. of $Na_2HPO_4$.

The alcohol phase containing HCl, $H_2O$ and some $H_3PO_4$ is scrubbed with concentrated NaCl brine which removes the $H_3PO_4$. The scrubbed alcohol is admixed with benzene as described in Example 1 whereby 97 gr. of aqueous HCl of 30% by weight strength are separated. The solvent mixture is then fractionated by distillation and the alcohol and benzene are separately recycled to the respective stages of the process.

The scrubbing brine is used for making up the recycled aqueous liquor (see above).

EXAMPLE 6

Preparation of anhydrous mono-sodium phosphate ($NaH_2PO_4$)

The original reaction liquor is composed as follows:

|  | Gr. |
|---|---|
| Water | 106.3 |
| $NaH_2PO_4$ | 54.0 |
| HCl | 0.2 |
| $H_3PO_4$ | 13.3 |
| NaCl | 50.0 |
| | 223.8 |

This reaction liquor is extracted at elevated temperature, preferably 60° C.±3° C., with an equal weight of n-butanol in counter-current.

The aqueous phase separated from the alcohol phase is admixed with 152 gr. of aqueous $H_3PO_4$ of 86.5% strength whereby 100 gr. of $NaH_2PO_4$ precipitated. The precipitate is separated from the supernatant mother liquor which has the following composition:

|  | Gr. |
|---|---|
| Water | 53.3 |
| $NaH_2PO_4$ | 54.0 |
| $H_3PO_4$ | 13.3 |
| HCl | 0.2 |

This liquor is made up with 50 gr. of NaCl and 53 gr. of $H_2O$, and recycled.

If a very pure product is desired, the precipitate is washed on the filter with part of the water that is to be added to the recycled liquor.

The alcohol phase is admixed with an equal volume of benzene whereby an aqueous acid mixture is separated, composed of 72 gr. of $H_2O$, 305 gr. of HCl and 52 gr. of $H_3PO_4$.

This mixture can be utilized as such, e.g. in the manufacture of mono-calcium phosphate from tertiary calcium phosphate. On the other hand, if desired, the HCl may be removed by distillation and the concentrated aqueous phosphoric acid be returned to the process. In this case, the removal of HCl need not be very complete.

EXAMPLE 7

Preparation of mono-sodium phosphate dihydrate ($NaH_2PO_4 \cdot 2H_2O$)

The original reaction liquor is composed as follows:

|  | Gr. |
|---|---|
| Water | 141.8 |
| $NaH_2PO_4$ | 54.0 |
| HCl | 0.2 |
| $H_3PO_4$ | 57.8 |
| NaCl | 50.0 |
| | 303.8 |

This liquor is extracted at 40° C. in countercurrent with approximately three times its volume of n-butanol until the chloride ion concentration in the aqueous liquor has dropped to 0.2% by weight. The extracted aqueous liquor is separated from the alcohol, cooled to 30° C. and admixed with 90 gr. of aqueous $H_3PO_4$ of 86.5% by weight strength, whereby 130 gr. of $NaH_2PO_4 \cdot 2H_2O$ are precipitated. The precipitate is separated from the mother liquor, which is composed as follows:

|  | Gr. |
|---|---|
| Water | 50.6 |
| $NaH_2PO_4$ | 54.0 |
| HCl | 0.2 |
| $H_3PO_4$ | 4.3 |

This liquor is made up with 83 gr. of water, 50 gr. of NaCl and 62 gr. of $H_3PO_4$ (86.5%), and recycled.

The alcohol extract is worked up as described in Example 6 and yields an aqueous acid mixture of substantially the same composition as mentioned in Example 6.

EXAMPLE 8

*Preparation of mono-potassium phosphate ($KH_2PO_4$)*

The original reaction liquor is composed as follows:

|  | Gr. |
|---|---|
| Water | 656 |
| KCl | 110 |
| $H_3PO_4$ | 234 |
|  | 1000 |

This liquor is extracted in counter-current with 3000 gr. to iso-butanol at a temperature comprised between 10° to 60° C., say at room temperature, whereby the chloride ion content of the aqueous liquor is reduced to 5 gr. The extracted aqueous liquor, amounting to 688 gr., is concentrated by the evaporation of 494 gr. of water. Thereby, 182 gr. of $KH_2PO_4$ are made to crystallize. The precipitate is separated from the supernatant mother liquor which contains:

|  | Gr. |
|---|---|
| Water | 60 |
| $H_3PO_4$ (85%) | 30 |
| KCl | 10 |

This liquor is made up with 596 gr. of water, 100 gr. of KCl and 204 gr. of $H_3PO_4$, and recycled.

The alcohol phase is admixed with an equal volume of benzene whereby an aqueous liquor is separated, containing:

|  | Gr. |
|---|---|
| Water | 200 |
| HCl | 49 |
| $H_3PO_4$ | 63 |

This is subjected to distillation whereby HCl is separated. The residual phosphoric acid is recycled.

The mixture of iso-butanol and benzene is fractionated by distillation and the two solvents are separately recycled to the respective stages of the process.

The invention is, of course, not limited to the examples described in detail hereinbefore. While alkali metals only have been mentioned specifically, the process is applicable to the preparation of water-soluble salts of other metals, e.g. magnesium sulfate, zinc sulfate, ferrous or ferric sulfate, ammonium salts of all three acids, and others. The term "metal" used in this specification includes the ammonium radical.

Instead of the $C_4$— and $C_5$— monohydric alcohols described, other solvents may be used, for example ethers such as diethyl ether, di-isopropyl ether, ketones such as methyl-ethyl ketone, or the like. Similarly, any desired or commercially available mixture of suitable solvents may be used.

We claim:

1. A process for the preparation of water-soluble salts selected from the group consisting of metal and ammonium sulfates, phosphates and nitrates, comprising reacting the corresponding chlorides with an acid substance selected from the group consisting of free sulfuric, phosphoric and nitric acids, acid sulfates and acid phosphates, by preparing an initial aqueous solution containing the chloride and the acid substance used as reactant, in which solution the ions present are in a state of equilibrium; causing displacement of said equilibrium by extracting said initial solution with a solvent selected from the group consisting of aliphatic monohydric alcohols having 4–5 carbon atoms, and being of limited mutual miscibility with water, in order to extract hydrochloric acid from the aqueous solution and to produce an equivalent amount of desired product; said extraction being carried out at a temperature below boiling temperature of the aqueous solution and of the solvent used for extraction; separating the aqueous solution and solvent extract from each other; keeping the aqueous solution at a temperature at which desired product separates as a solid phase from the aqueous phase; separating this solid phase from the aqueous solution; restoring the initial composition of the aqueous solution by addition of salt and acid thereto, the restored aqueous solution being then treated again by solvent extraction in order to bring about further formation of desired product.

2. A process as claimed in claim 1, wherein the reaction in the aqueous solution and the extraction are carried out at temperatures not exceeding 63° C.

3. A process as claimed in claim 1, wherein the extracted aqueous solution separated from the solvent extract is cooled in order to precipitate desired product.

4. A process as claimed in claim 1, in which the initial aqueous solution contains the anion of the desired product in excess over the chloride ion.

5. A process as claimed in claim 1, wherein the solvent phase separated from the aqueous phase is admixed with a second solvent which is selected from the group consisting of petroleum and aromatic hydrocarbon solvents and is miscible with said separated solvent phase, and an aqueous liquor containing HCl is separated from the solvent mixture.

6. A process as claimed in claim 5, wherein the solvent mixture separated from the aqueous liquor is fractionated by distillation and the solvent fractions are separately recycled to the respective stages of the process.

7. A process as claimed in claim 1, for the preparation of water-soluble nitrates, wherein the solvent extract separated from the aqueous reaction liquor is scrubbed with aqueous chloride solution for freeing it from free acid used as starting material and extracted by the solvent together with hydrochloric acid.

8. A process as claimed in claim 7, wherein the solvent extract is scrubbed with an aqueous solution of the chloride used as starting material of the process.

9. A process as claimed in claim 5, for the preparation of water-soluble phosphates, wherein the aqueous liquor separated from the solvent mixture is subjected to fractional distillation in order to produce a distillate of aqueous HCl.

References Cited in the file of this patent

UNITED STATES PATENTS

| 1,389,862 | Comment | Sept. 6, 1921 |
| 1,456,831 | Ross et al. | May 29, 1923 |
| 1,929,442 | Milligan | Oct. 10, 1933 |
| 1,929,443 | Milligan | Oct. 10, 1933 |
| 2,060,715 | Arvin | Nov. 10, 1936 |
| 2,111,360 | Cutting | Mar. 15, 1938 |
| 2,148,429 | Beekhuis | Feb. 28, 1939 |
| 2,248,740 | Bezanson | July 8, 1941 |

OTHER REFERENCES

Laury: "Hydrochloric Acid and Sodium Sulfate," The Chemical Catalog Co., Inc., New York, 1927, page 19.